US012513422B2

(12) United States Patent
Park et al.

(10) Patent No.: US 12,513,422 B2
(45) Date of Patent: Dec. 30, 2025

(54) IMAGE SENSOR AND IMAGE PROCESSING SYSTEM INCLUDING THE SAME

(71) Applicant: SK hynix Inc., Gyeonggi-do (KR)

(72) Inventors: Han Sol Park, Gyeonggi-do (KR);
Shin Hoo Kim, Gyeonggi-do (KR);
Jong Hyun Ra, Gyeonggi-do (KR);
Gun Hee Yun, Gyeonggi-do (KR);
Seung Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 153 days.

(21) Appl. No.: 18/423,293

(22) Filed: Jan. 26, 2024

(65) Prior Publication Data

US 2025/0080867 A1    Mar. 6, 2025

(30) Foreign Application Priority Data

Aug. 30, 2023   (KR) .................. 10-2023-0114641

(51) Int. Cl.
*H04N 25/60* (2023.01)
*H04N 25/704* (2023.01)
*H04N 25/766* (2023.01)
*H04N 25/77* (2023.01)
*H04N 25/778* (2023.01)
*H04N 25/78* (2023.01)

(52) U.S. Cl.
CPC ........... *H04N 25/60* (2023.01); *H04N 25/704* (2023.01); *H04N 25/77* (2023.01)

(58) Field of Classification Search
CPC ...... H04N 25/60; H04N 25/704; H04N 25/77; H04N 25/11; H04N 25/46; H04N 25/766; H04N 25/778; H04N 25/78
See application file for complete search history.

(56) References Cited

U.S. PATENT DOCUMENTS

| | | | |
|---|---|---|---|
| 11,997,405 B2* | 5/2024 | Park | H04N 23/672 |
| 12,035,059 B2* | 7/2024 | Shimada | H04N 25/42 |
| 2015/0381869 A1* | 12/2015 | Mlinar | H04N 23/672 |
| | | | 348/222.1 |
| 2022/0399386 A1* | 12/2022 | Hoshino | H04N 25/134 |
| 2023/0007197 A1 | 1/2023 | Park et al. | |
| 2023/0012537 A1 | 1/2023 | Shimada | |
| 2024/0323568 A1* | 9/2024 | Lee | H03M 1/56 |

* cited by examiner

*Primary Examiner* — Marly S Camargo
(74) *Attorney, Agent, or Firm* — IP & T GROUP LLP

(57) ABSTRACT

Disclosed is an image sensor and an image processing system including the same, and the image sensor includes a first pixel pair arranged in a first row, and configured to generate, during a first single readout time, first and second pixel signals according to a first order, a second pixel pair arranged in the first row, and configured to generate, during the first single readout time, third and fourth pixel signals according to a second order which is different from the first order, and a row controller configured to control, during the first single readout time, the first pixel pair according to the first order and the second pixel pair according to the second order.

20 Claims, 11 Drawing Sheets

IMAGE SENSOR AND IMAGE PROCESSING SYSTEM INCLUDING THE SAME

CROSS-REFERENCE TO RELATED APPLICATION(S)

This application claims priority under 35 U.S.C. § 119 to Korean Patent Application No. 10-2023-0114641, filed on Aug. 30, 2023, the disclosure of which is incorporated herein by reference in its entirety.

BACKGROUND

1. Field

Various embodiments of the present disclosure relate to a semiconductor design technique, and more particularly, to an image sensor and an image processing system including the same.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

The image sensors support a phase detection auto focus (PDAF) function. The phase detection auto focus function is a function that adjusts focus by detecting a phase difference of incident light. The phase detection auto focus function is useful in high-speed shooting or video shooting that requires quick focus adjustment.

SUMMARY

Various embodiments of the present disclosure are directed to an image sensor capable of suppressing noise reflected in pixel signals, and an image processing system including the image sensor.

In accordance with an embodiment of the present disclosure, an image sensor may include: a first pixel pair arranged in a first row, and configured to generate, during a first single readout time, first and second pixel signals according to a first order; a second pixel pair arranged in the first row, and configured to generate, during the first single readout time, third and fourth pixel signals according to a second order which is different from the first order; and a row controller configured to control, during the first single readout time, the first pixel pair according to the first order and the second pixel pair according to the second order.

In accordance with an embodiment of the present disclosure, an image processing system may include: an image sensor including pixel pairs arranged at intersections of a plurality of rows and a plurality of columns, and configured to differently control a readout order of pixel pairs arranged in a same row among the plurality of pixel pairs and differently control a readout order of pixel pairs arranged in a same column among the plurality of pixel pairs; and an image processor configured to generate image data related to phase detection auto focus (PDAF) based on pixel signals generated by the image sensor.

In accordance with an embodiment of the present disclosure, a method of operating an image sensor may include: generating, during a first single readout time, first and second pixel signals through a first pixel pair arranged in a first row, according to a first order; and generating, during the first single readout time, third and fourth pixel signals through a second pixel pair arranged in the first row according to a second order which is different from the first order, wherein the first and second pixel pairs are connected to neighboring columns.

BRIEF DESCRIPTION OF THE DRAWINGS

FIG. 3 is a schematic diagram illustrating an example of a pixel array illustrated in FIG. 2.

FIGS. 6 to 11 are diagrams illustrating operations of the image processing system in accordance with embodiments of the present disclosure.

DETAILED DESCRIPTION

Various embodiments of the present disclosure are described below with reference to the accompanying drawings, in order to describe in detail the embodiments of the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements but may further include or have the one or more other elements, unless otherwise mentioned. In the description throughout the specification, some components are described in singular forms, but the present disclosure is not limited thereto, and it will be understood that the components may be formed in plural.

Figure 1:
FIG. 1 is a block diagram illustrating an image processing system in accordance with an embodiment of the present disclosure.

FIG. 1 is a block diagram illustrating an image processing system 10 in accordance with an embodiment of the present disclosure.

Referring to FIG. 1, the image processing system 10 may include an image sensor 100 and an image processor 200.

The image sensor 100 may generate pixel signals DPXs on the basis of incident light.

The image processor 200 may generate image data PDAFs related to phase detection auto focus (PDAF) on the basis of the pixel signals DPXs. For example, the image processor 200 may generate the image data PDAFs by performing an average calculating operation and a subtraction operation on the pixel signals DPXs for each region. Herein, the image data PDAFs may be data for the PDAF having excellent quality as noise reflected in the pixel signals DPXs is removed (canceled) or offset. The noise may be power noise that varies depending on a readout point in time when the image sensor 100 reads out the pixel signals DPXs.

Figure 2:
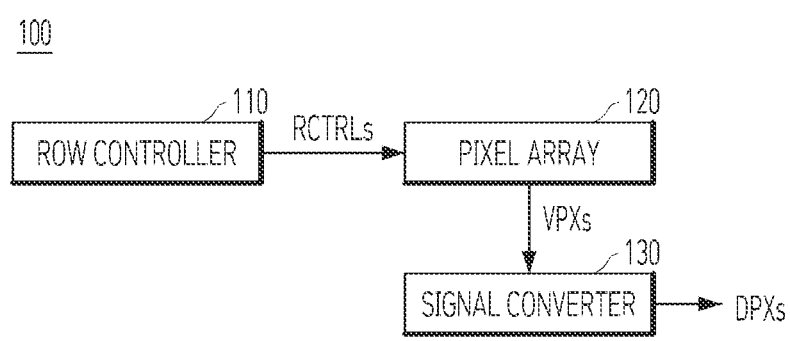
FIG. 2 is a detailed block diagram illustrating an image sensor illustrated in FIG. 1.

FIG. 2 is a detailed block diagram illustrating the image sensor 100 illustrated in FIG. 1.

Referring to FIG. 2, the image sensor 100 may include a row controller 110, a pixel array 120, and a signal converter 130.

The row controller 110 may generate row control signals RCTRLs for controlling the pixel array 120 for each row. For example, the row controller 110 may generate first row control signals for controlling pixels arranged in a first row of the pixel array 120 and $y^{th}$ row control signals for controlling pixels arranged in an $y^{th}$ row of the pixel array 120, where "y" is a natural number greater than 1. The first and $y^{th}$ row control signals may be included in the row control signals RCTRLs.

The pixel array 120 may generate pixel signals VPXs corresponding to the incident light, in response to the row control signals RCTRLs. The pixel array 120 may include a plurality of pixel pairs PX11 to PX44 (refer to FIG. 3). The plurality of pixel pairs PX11 to PX44 may be arranged at intersections of a plurality of rows and a plurality of columns.

The signal converter 130 may generate digital-type pixel signals DPXs on the basis of the analog-type pixel signals VPXs. For example, the signal converter 130 may include an analog to digital converter (ADC).

Figure 3:
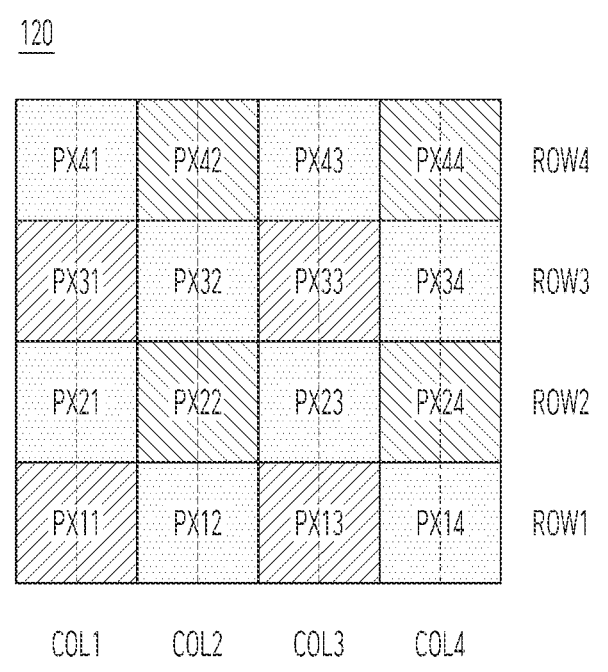

FIG. 3 is a schematic diagram illustrating an example of the pixel array 120 illustrated in FIG. 2. For convenience in description, in FIG. 3 the pixel array 120 includes 4×4 pixel pairs, that is, first to $16^{th}$ pixel pairs PX11 to PX44.

Referring to FIG. 3, the pixel array 120 may include the first to fourth pixel pairs PX11 to PX14 arranged in a first row ROW1; the fifth to eighth pixel pairs PX21 to PX24 arranged in a second row ROW2; the ninth to $12^{th}$ pixel pairs PX31 to PX34 arranged in a third row ROW3; and the $13^{th}$ to $16^{th}$ pixel pairs PX41 to PX44 arranged in a fourth row ROW4.

For example, the first and second pixel pairs PX11 and PX12 arranged in the first row ROW1 may be controlled according to a first order during a first single readout time, and the third and fourth pixel pairs PX13 and PX14 arranged in the first row ROW1 may be controlled according to a second order during the first single readout time. The fifth and sixth pixel pairs PX21 and PX22 arranged in the second row ROW2 may be controlled according to the second order during a second single readout time, and the seventh and eighth pixel pairs PX23 and PX24 arranged in the second row ROW2 may be controlled according to the first order during the second single readout time. The ninth and $10^{th}$ pixel pairs PX31 and PX32 arranged in the third row ROW3 may be controlled according to the second order during a third single readout time, and the $11^{th}$ and $12^{th}$ pixel pairs PX33 and PX34 arranged in the third row ROW3 may be controlled according to the first order during the third single readout time. The $13^{th}$ and $14^{th}$ pixel pairs PX41 and PX42 arranged in the fourth row ROW4 may be controlled according to the first order during a fourth single readout time, and the $15^{th}$ and $16^{th}$ pixel pairs PX43 and PX44 arranged in the fourth row ROW4 may be controlled according to the second order during the fourth single readout time. The second order may be different from the first order. For example, the second order may be the opposite of the first order.

The first pixel pair PX11, the fifth pixel pair PX21, the ninth pixel pair PX31, and the $13^{th}$ pixel pair PX41 may be arranged in a first column COL1. The second pixel pair PX12, the sixth pixel pair PX22, the $10^{th}$ pixel pair PX32, and the $14^{th}$ pixel pair PX42 may be arranged in a second column COL2. The third pixel pair PX13, the seventh pixel pair PX23, the $11^{th}$ pixel pair PX33, and the $15^{th}$ pixel pair PX43 may be arranged in a third column COL3. The fourth pixel pair PX14, the eighth pixel pair PX24, the $12^{th}$ pixel pair PX34, and the $16^{th}$ pixel pair PX44 may be arranged in a fourth column COL4.

In addition, the first pixel pair PX11, the third pixel pair PX13, the ninth pixel pair PX31, and the $11^{th}$ pixel pair PX33 may have the same color filter, for example, a red color filter. The second pixel pair PX12, the fourth pixel pair PX14, the $10^{th}$ pixel pair PX32, and the $12^{th}$ pixel pair PX34 may have the same color filter, for example, a green color filter. The fifth pixel pair PX21, the seventh pixel pair PX23, the $13^{th}$ pixel pair PX41, and the $15^{th}$ pixel pair PX43 may have the same color filter, for example, a green color filter. The sixth pixel pair PX22, the eighth pixel pair PX24, the $14^{th}$ pixel pair PX42, and the $16^{th}$ pixel pair PX44 may have the same color filter, for example, a blue color filter.

Each of the first to $16^{th}$ pixel pairs PX11 to PX44 may include two pixels (i.e., a left pixel and a right pixel) on the basis of a dotted line. The left pixel may be disposed on a left side in a layout of each pixel pair, and the right pixel may be disposed on a right side in the layout of each pixel pair. For example, the left pixel and the right pixel may share one lens, for example, micro lens, and have the same color filter. Each of the first to $16^{th}$ pixel pairs PX11 to PX44 may have a 2PD (photo diodes) structure.

Figure 4:
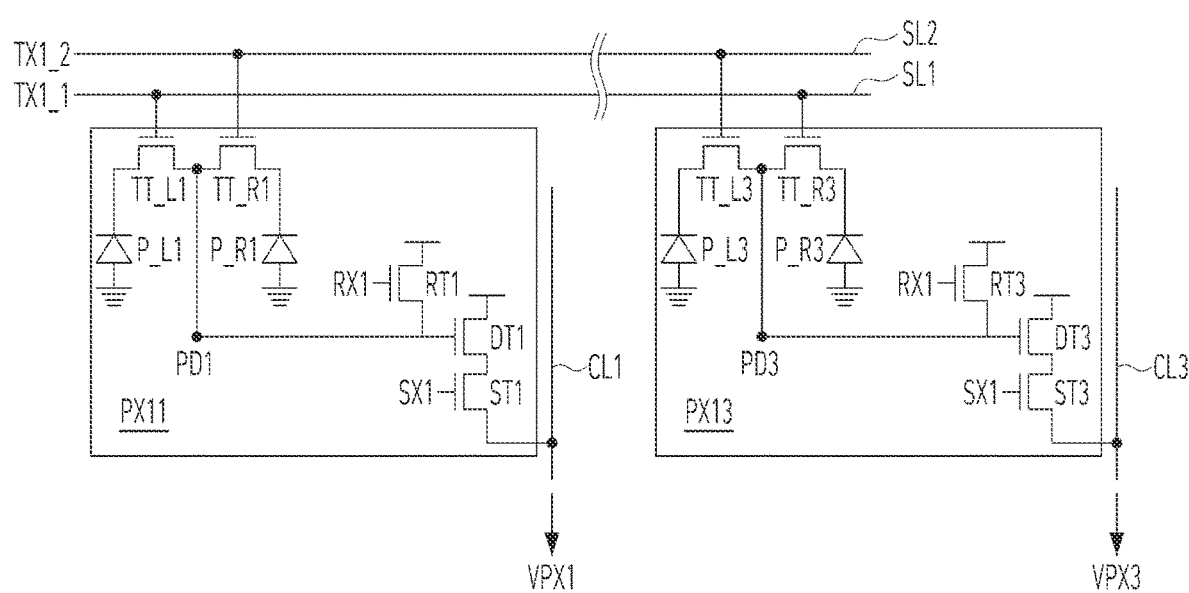
FIG. 4 is a circuit diagram illustrating an example of pixel pairs and signal lines included in a first row illustrated in FIG. 3.

FIG. 4 is a circuit diagram illustrating an example of some pixel pairs and some signal lines related to the first row ROW1 illustrated in FIG. 3. A first transmission control signal TX1_1, a second transmission control signal TX1_2, a first reset control signal RX1, and a first selection control signal SX1 illustrated in FIG. 4 may be signals included in the first row control signals among the row control signals RCTRLs.

Referring to FIG. 4, the first pixel pair PX11 and the third pixel pair PX13 may be connected to first and second signal lines SL1 and SL2. The first signal line SL1 may transmit the first transmission control signal TX1_1, and the second signal line SL2 may transmit the second transmission control signal TX1_2.

The first pixel pair PX11 may include a first photodiode P_L1, a first transmission transistor TT_L1, a second photodiode P_R1, a second transmission transistor TT_R1, a first floating diffusion node FD1, a first reset transistor RT1, a first driving transistor DT1, and a first selection transistor ST1.

The first photodiode P_L1 may be connected between a low voltage terminal, for example, a ground terminal, and the first transmission transistor TT_L1. The first photodiode P_L1 may be a light receiving element that generates first charges corresponding to the incident light. For example, the first photodiode P_L1 may correspond to the left pixel. The first photodiode P_L1 may be replaced with different types of light receiving elements such as a phototransistor, a photogate, a pinned photodiode or a combination thereof.

The first transmission transistor TT_L1 may be connected between the first photodiode P_L1 and the first floating diffusion node FD1. The first transmission transistor TT_L1 may transmit the first charges generated by the first photodiode P_L1 to the first floating diffusion node FD1 in response to the first transmission control signal TX1_1.

The second photodiode P_R1 may be connected between the low voltage terminal and the second transmission transistor TT_R1. The second photodiode P_R1 may be a light receiving element that generates second charges corresponding to the incident light. For example, the second photodiode P_R1 may correspond to the right pixel. The second photodiode P_R1 may be replaced with different types of light receiving elements such as a phototransistor, a photogate, a pinned photodiode or a combination thereof.

The second transmission transistor TT_R1 may be connected between the second photodiode P_R1 and the first floating diffusion node FD1. The second transmission transistor TT_R1 may transmit the second charges generated by the second photodiode P_R1 to the first floating diffusion node FD1 in response to the second transmission control signal TX1_2.

The first floating diffusion node FD1 may accumulate and store the first charges and/or the second charges transmitted from the first and second transmission transistors TT_L1 and TT_R1. Although not illustrated, a parasitic capacitor capable of accumulating and storing the first charges and/or the second charges may be connected to the first floating diffusion node FD1.

The first reset transistor RT1 may reset the first floating diffusion node FD1. For example, the first reset transistor RT1 may electrically connect the first floating diffusion node FD1 to a high voltage terminal, for example, VDD, in response to the first reset control signal RX1, thereby removing or releasing charges remaining in the first floating diffusion node FD1.

The first driving transistor DT1 may be connected between the high voltage terminal and the first selection transistor ST1. A gate terminal of the first driving transistor DT1 may be connected to the first floating diffusion node FD1. The first driving transistor DT1 may generate a first pixel signal VPX1 on the basis of a voltage level loaded onto the first floating diffusion node FD1.

The first selection transistor ST1 may be connected between the first driving transistor DT1 and a first column line CL1. The first selection transistor ST1 may output the first pixel signal VPX1 through the first column line CL1 in response to the first selection control signal SX1.

Likewise, the third pixel pair PX13 may include a fifth photodiode P_L3, a fifth transmission transistor TT_L3, a sixth photodiode P_R3, a sixth transmission transistor TT_R3, a third floating diffusion node FD3, a third reset transistor RT3, a third driving transistor DT3, and a third selection transistor ST3.

The fifth photodiode P_L3 may be connected between the low voltage terminal and the fifth transmission transistor TT_L3. The fifth photodiode P_L3 may be a light receiving element that generates fifth charges corresponding to the incident light. For example, the fifth photodiode P_L3 may correspond to the left pixel. The fifth photodiode P_L3 may be replaced with different types of light receiving elements such as a phototransistor, a photogate, a pinned photodiode or a combination thereof.

The fifth transmission transistor TT_L3 may be connected between the fifth photodiode P_L3 and the third floating diffusion node FD3. The fifth transmission transistor TT_L3 may transmit the fifth charges generated by the fifth photodiode P_L3 to the third floating diffusion node FD3 in response to the second transmission control signal TX1_2.

The sixth photodiode P_R3 may be connected between the low voltage terminal and the sixth transmission transistor TT_R3. The sixth photodiode P_R3 may be a light receiving element that generates sixth charges corresponding to the incident light. For example, the sixth photodiode P_R3 may correspond to the right pixel. The sixth photodiode P_R3 may be replaced with different types of light receiving elements such as a phototransistor, a photogate, a pinned photodiode or a combination thereof.

The sixth transmission transistor TT_R3 may be connected between the sixth photodiode P_R3 and the third floating diffusion node FD3. The sixth transmission transistor TT_R3 may transmit the sixth charges generated by the sixth photodiode P_R3 to the third floating diffusion node FD3 in response to the first transmission control signal TX1_1.

The third floating diffusion node FD3 may accumulate and store the fifth charges and/or the sixth charges transmitted from the fifth and sixth transmission transistors TT_L3 and TT_R3. Although not illustrated, a parasitic capacitor capable of accumulating and storing the fifth charges and/or the sixth charges may be connected to the third floating diffusion node FD3.

The third reset transistor RT3 may reset the third floating diffusion node FD3. For example, the third reset transistor RT3 may electrically connect the third floating diffusion node FD3 to the high voltage terminal in response to the first reset control signal RX1, thereby removing or releasing charges remaining in the third floating diffusion node FD3.

The third driving transistor DT3 may be connected between the high voltage terminal and the third selection transistor ST3. A gate terminal of the third driving transistor DT3 may be connected to the third floating diffusion node FD3. The third driving transistor DT3 may generate a third pixel signal VPX3 on the basis of a voltage level loaded onto the third floating diffusion node FD3.

The third selection transistor ST3 may be connected between the third driving transistor DT3 and a third column line CL3. The third selection transistor ST3 may output the third pixel signal VPX3 through the third column line CL3 in response to the first selection control signal SX1.

As illustrated in FIG. 4, the left pixel of the first pixel pair PX11 may be connected to the first signal line SL1, and the right pixel of the first pixel pair PX11 may be connected to the second signal line SL2. Conversely, the left pixel of the third pixel pair PX13 may be connected to the second signal line SL2, and the right pixel of the third pixel pair PX13 may be connected to the first signal line SL1. Accordingly, the first pixel pair PX11 may generate the first pixel signal VPX1 corresponding to the left pixel according to the first order, and then generate the first pixel signal VPX1 corresponding to the right pixel. The third pixel pair PX13 may generate the third pixel signal VPX3 corresponding to the right pixel according to the second order, and then generate the third pixel signal VPX3 corresponding to the left pixel.

Figure 5:
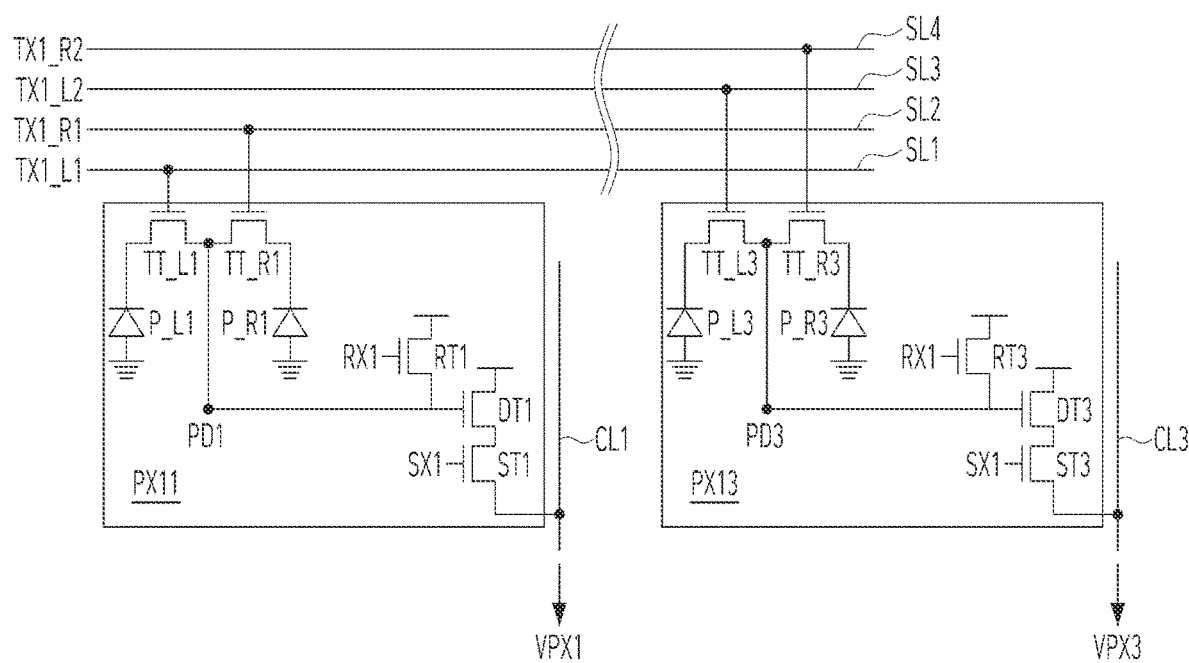
FIG. 5 is a circuit diagram illustrating another example of pixel pairs and signal lines included in the first row illustrated in FIG. 3.

FIG. 5 is a circuit diagram illustrating another example of the pixel pairs and signal lines included in the first row illustrated in FIG. 3. A first transmission control signal TX1_L1, a second transmission control signal TX1_R1, a third transmission control signal TX1_L2, a fourth transmission control signal TX1_R2, a first reset control signal RX1, and a first selection control signal SX1 illustrated in FIG. 5 may be signals included in the first row control signals among the row control signals RCTRLs.

Since the first pixel pair PX11 and the third pixel pair PX13 illustrated in FIG. 5 have the same configurations as those illustrated in FIG. 4, detailed descriptions thereof are omitted. However, of the first pixel pair PX11, the left pixel may be connected to a first signal line SL1 and be controlled by the first transmission control signal TX1_L1, and the right pixel may be connected to a second signal line SL2 and be controlled by the second transmission control signal TX1_R1, and of the third pixel pair PX13, the left pixel may be connected to a third signal line SL3 and be controlled by the third transmission control signal TX1_L2, and the right pixel may be connected to a fourth signal line SL4 and be controlled by the fourth transmission control signal TX1_R2. In this case, the first and second transmission control signals TX1_L1 and TX1_R1 may be activated according to the first order. For example, the first transmission control signal TX1_L1 may be activated, and then the second transmission control signal TX1_R1 may be activated. Conversely, the third and fourth transmission control signals TX1_L2 and TX1_R2 may be activated according to the second order. For example, the fourth transmission control signal TX1_R2 may be activated, and then the third transmission control signal TX1_L2 may be activated.

Hereinafter, an operation of the image processing system 10 according to the present embodiment, which has the above-described configuration, is described with reference to FIGS. 6 to 11.

Figure 6:
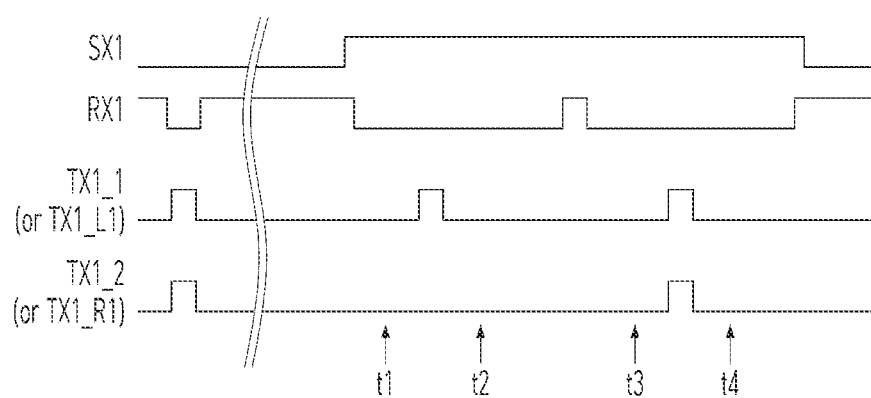
Figure 7:
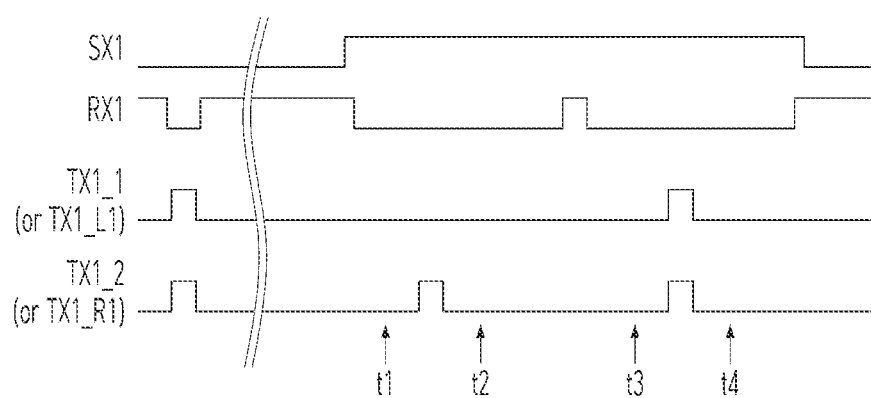
Figure 8:
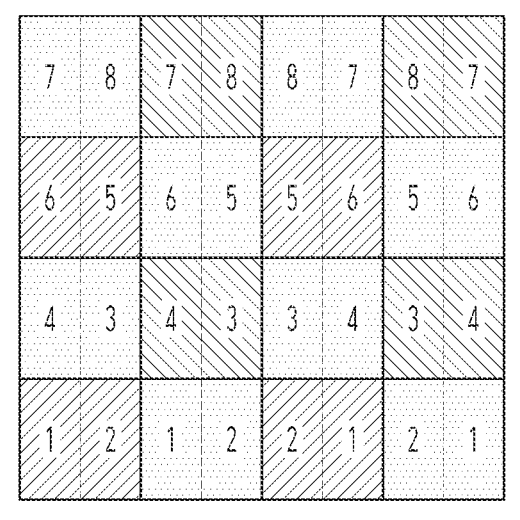

FIGS. 6 to 8 are diagrams illustrating an operation of the image sensor 100 according to a first readout method in accordance with an embodiment of the present disclosure. The first readout method refers to a method in which a reset signal R1 and a data signal S1 of one pixel of a pixel pair are sequentially read out as a pixel signal, and then a reset signal R2 and a data signal S2 of the other pixel of the pixel pair are sequentially read out as the pixel signal (that is, R1→S1→R2→S2).

FIG. 6 is a timing diagram illustrating an operation of first reading out a pixel signal of the left pixel of the pixel pair according to the first readout method. For example, FIG. 6 is a timing diagram representatively illustrating a readout operation related to the first pixel pair PX11.

Referring to FIG. 6, during the first single readout time, the first pixel pair PX11 may output a reset signal of the left pixel of the first pixel pair PX11 as the first pixel signal VPX1 at a first point in time t1, output a data signal of the left pixel as the first pixel signal VPX1 at a second point in time t2 after the first point of time t1, output a reset signal of the right pixel of the first pixel pair PX11 as the first pixel signal VPX1 at a third point of time t3 after the second point of time t2, and output a data signal of the right pixel as the first pixel signal VPX1 at a fourth point of time t4 after the third point of time t3.

FIG. 7 is a timing diagram illustrating an operation of first reading out a pixel signal of the right pixel of the pixel pair according to the first readout method. For example, FIG. 7 is a timing diagram representatively illustrating a readout operation related to the first pixel pair PX11.

Referring to FIG. 7, the first pixel pair PX11 may output a reset signal of the right pixel of the first pixel pair PX11 as the first pixel signal VPX1 at a first point in time t1, output a data signal of the right pixel as the first pixel signal VPX1 at a second point in time t2 after the first point in time t1, output a reset signal of the left pixel of the first pixel pair PX11 as the first pixel signal VPX1 at a third point in time t3 after the second point in time t2, and output a data signal of the left pixel as the first pixel signal VPX1 at a fourth point in time t4 after the third point in time t3.

FIG. 8 is a schematic diagram illustrating a readout order according to the first readout method. Hereinafter, an operation related to the first pixel pair PX11, the third pixel pair PX13, the ninth pixel pair PX31, and the 11$^{th}$ pixel pair PX33 having the same color filter, for example, a red color filter, is representatively described.

Referring to FIG. 8, during the first single readout time allocated to the first row ROW1, the first pixel pair PX11 arranged in the first row ROW1 may generate pixel signals according to a first order. For example, the first pixel pair PX11 may read out (1) the first pixel signal VPX1 corresponding to a left pixel, and then read out (2) the first pixel signal VPX1 corresponding to a right pixel. In this case, first power noise (a) may be reflected in the first pixel signal VPX1 corresponding to the left pixel, which has been first read out (1), and second power noise (b) may be reflected in the first pixel signal VPX1 corresponding to the right pixel, which has been subsequently read out (2).

Conversely, during the first single readout time, the third pixel pair PX13 arranged in the first row ROW1 may generate pixel signals according to a second order. For example, the third pixel pair PX13 may read out (1) the third pixel signal VPX3 corresponding to a right pixel, and then read out (2) the third pixel signal VPX3 corresponding to a left pixel. In this case, the first power noise (a) may be reflected in the third pixel signal VPX3 corresponding to the right pixel, which has been first read out (1), and the second power noise (b) may be reflected in the third pixel signal VPX3 corresponding to the left pixel, which has been subsequently read out (2).

During the third single readout time allocated to the third row ROW3, the ninth pixel pair PX31 arranged in the third row ROW3 may generate pixel signals according to the second order. For example, the ninth pixel pair PX31 may read out (5) the first pixel signal VPX1 corresponding to a right pixel, and then read out (6) the first pixel signal VPX1 corresponding to a left pixel. In this case, the first power noise (a) may be reflected in the first pixel signal VPX1 corresponding to the right pixel, which has been first read out (5), and the second power noise (b) may be reflected in the first pixel signal VPX1 corresponding to the left pixel, which has been subsequently read out (6).

Conversely, during the third single readout time, the 11$^{th}$ pixel pair PX33 arranged in the third row ROW3 may generate pixel signals according to the first order. For example, the 11$^{th}$ pixel pair PX33 may read out (5) the third pixel signal VPX3 corresponding to a left pixel, and then read out (6) the third pixel signal VPX3 corresponding to a right pixel. In this case, the first power noise (a) may be reflected in the third pixel signal VPX3 corresponding to the left pixel, which has been first read out (5), and the second power noise (b) may be reflected in the third pixel signal VPX3 corresponding to the right pixel, which has been subsequently read out (6).

The image processor 200 may calculate a first average value AVR1 on the basis of the first pixel signal VPX1 corresponding to the left pixel of the first pixel pair PX11, the third pixel signal VPX3 corresponding to the left pixel of the third pixel pair PX13, the first pixel signal VPX1 corresponding to the left pixel of the ninth pixel pair PX31, and the third pixel signal VPX3 corresponding to the left pixel of the 11$^{th}$ pixel pair PX33. For example, the first average value AVR1 may be calculated as shown in Equation 1 below.

$$AVR1 = (L1 + L3 + L9 + L11)/4 + (2a + 2b)/4 \quad \text{[Equation 1]}$$

Herein, "L1" may refer to a pixel value of the first pixel signal VPX1 corresponding to the left pixel of the first pixel pair PX11, "L3" may refer to a pixel value of the third pixel signal VPX3 corresponding to the left pixel of the third pixel pair PX13, "L9" may refer to a pixel value of the first pixel signal VPX1 corresponding to the left pixel of the ninth pixel pair PX31, and "L11" may refer to a pixel value of the third pixel signal VPX3 corresponding to the left pixel of the 11$^{th}$ pixel pair PX33. "2a" may be a value obtained by adding up the first power noise (a), which is reflected in the first pixel signal VPX1 corresponding to the left pixel of the first pixel pair PX11, and the first power noise (a), which is reflected in the third pixel signal VPX3 corresponding to the left pixel of the 11$^{th}$ pixel pair PX33. "2b" may be a value obtained by adding up the second power noise (b), which is reflected in the third pixel signal VPX3 corresponding to the left pixel of the third pixel pair PX13, and the second power noise (b), which is reflected in the first pixel signal VPX1 corresponding to the left pixel of the ninth pixel pair PX31.

The image processor 200 may calculate a second average value AVR2 on the basis of the first pixel signal VPX1 corresponding to the right pixel of the first pixel pair PX11, the third pixel signal VPX3 corresponding to the right pixel of the third pixel pair PX13, the first pixel signal VPX1 corresponding to the right pixel of the ninth pixel pair PX31, and the third pixel signal VPX3 corresponding to the right pixel of the 11$^{th}$ pixel pair PX33. For example, the second average value AVR2 may be calculated as shown in Equation 2 below.

$$AVR2 = (R1 + R3 + R9 + R11)/4 + (2a + 2b)/4 \quad \text{[Equation 2]}$$

Herein, "R1" may refer to a pixel value of the first pixel signal VPX1 corresponding to the right pixel of the first pixel pair PX11, "R3" may refer to a pixel value of the third pixel signal VPX3 corresponding to the right pixel of the third pixel pair PX13, "R9" may refer to a pixel value of the first pixel signal VPX1 corresponding to the right pixel of the ninth pixel pair PX31, and "R11" may refer to a pixel value of the third pixel signal VPX3 corresponding to the right pixel of the 11$^{th}$ pixel pair PX33. "2a" may be a value obtained by adding up the first power noise (a), which is reflected in the third pixel signal VPX3 corresponding to the right pixel of the third pixel pair PX13, and the first power noise (a), which is reflected in the first pixel signal VPX1 corresponding to the right pixel of the ninth pixel pair PX31. "2b" may be a value obtained by adding up the second power noise (b), which is reflected in the first pixel signal VPX1 corresponding to the right pixel of the first pixel pair PX11, and the second power noise (b), which is reflected in the third pixel signal VPX3 corresponding to the right pixel of the 11$^{th}$ pixel pair PX33.

The image processor 200 may generate the image data PDAFs by performing an average calculating operation and a subtraction operation on the pixel signals DPXs for each region. For example, the image processor 200 may generate first image data PDAF1 corresponding to a difference between the first and second average values AVR1 and AVR2 in a 4×4 region including the first to 16$^{th}$ pixel pairs PX11 to PX44. Although the embodiment of the present disclosure describes using the 4×4 region as an example, the present disclosure is not necessarily limited to this, and may be implemented in a wider region, for example, a 64×64 region, etc. For example, the first image data PDAF1 may be calculated as shown in Equation 3 below.

$$\begin{aligned} PDAF1 &= \{(L1 + L3 + L9 + L11)/4 + (2a + 2b)/4\} - \\ &\quad \{(R1 + R3 + R9 + R11)/4 + (2a + 2b)/4\} = \\ &\quad (L1 + L3 + L9 + L11)/4 - (R1 + R3 + R9 + R11)/4 \end{aligned} \quad \text{[Equation 3]}$$

As shown in Equation 3 above, the first image data PDAF1 may be the image data for PDAF having excellent quality as the first and second power noise (a) and (b) reflected in the pixel signals of the first pixel pair PX11, the third pixel pair PX13, the ninth pixel pair PX31, and the 11$^{th}$ pixel pair PX33 are removed or offset.

Figure 9:
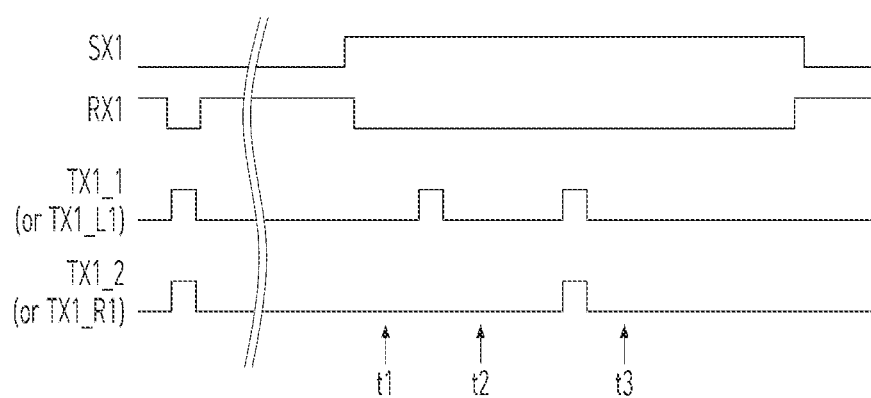
Figure 10:
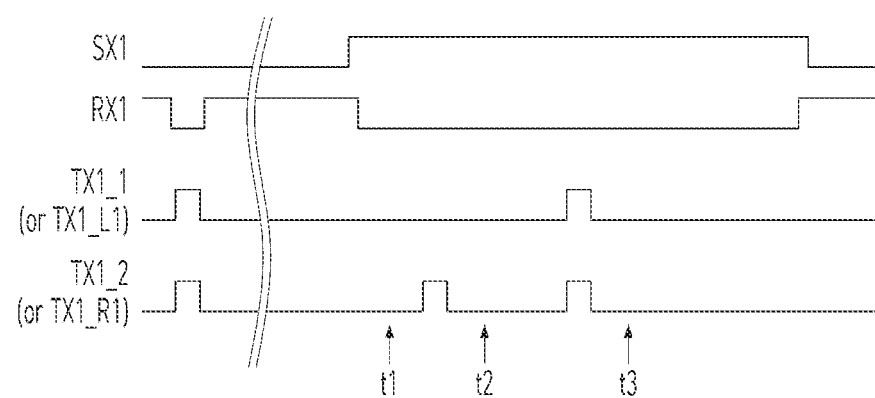
Figure 11:
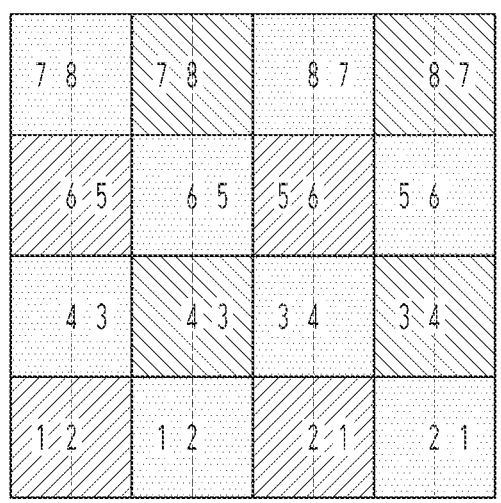

FIGS. 9 to 11 are diagrams illustrating an operation of the image sensor 100 according to a second readout method in accordance with an embodiment of the present disclosure. The second readout method refers to a method in which a reset signal R1 and a data signal S1 of a pixel included in a pixel pair are sequentially read out as a pixel signal, and then a summed data signal S2 of the pixels included in the pixel pair is read out as the pixel signal (that is, R1→S1→S2).

FIG. 9 is a timing diagram illustrating an operation of first reading out a pixel signal of the left pixel of the pixel pair according to the second readout method. For example, FIG. 9 is a timing diagram representatively illustrating a readout operation related to the first pixel pair PX11.

Referring to FIG. 9, during the second single readout time, the first pixel pair PX11 may output a reset signal of the left pixel included in the first pixel pair PX11 as the first pixel signal VPX1 at a first point in time t1, output a data signal of the left pixel as the first pixel signal VPX1 at a second point in time t2 after the first point in time t1, and output a summed data signal of data signals of the left and right pixels included in the first pixel pair PX11 as the first pixel signal VPX1 at a third point in time t3 after the second point in time t2.

FIG. 10 is a timing diagram illustrating an operation of first reading out a pixel signal of the right pixel of the pixel pair according to the second readout method. For example, FIG. 10 is a timing diagram representatively illustrating a readout operation related to the first pixel pair PX11.

Referring to FIG. 10, the first pixel pair PX11 may output a reset signal of the right pixel included in the first pixel pair PX11 as the first pixel signal VPX1 at a first point in time t1, output a data signal of the right pixel as the first pixel signal VPX1 at a second point in time t2 after the first point in time t1, and output a summed data signal of data signals of the right and left pixels included in the first pixel pair PX11 as the first pixel signal VPX1 at a third point in time t3 after the second point in time t2.

FIG. 11 is a diagram illustrating a readout order according to the second readout method. Hereinafter, an operation related to the first pixel pair PX11, the third pixel pair PX13, the ninth pixel pair PX31, and the 11$^{th}$ pixel pair PX33 having the same color filter, for example, a red color filter, is representatively described.

Referring to FIG. 11, during the first single readout time allocated to the first row ROW1, the first pixel pair PX11 arranged in the first row ROW1 may generate pixel signals according to a first order. For example, the first pixel pair PX11 may read out (1) the first pixel signal VPX1 corresponding to a left pixel, and then read out (2) a summed pixel signal corresponding to the left and right pixels as the first pixel signal VPX1. In this case, first power noise (a) may be reflected in the first pixel signal VPX1 corresponding to the left pixel, which has been first read out (1), and second power noise (b) may be reflected in the first pixel signal VPX1 corresponding to the left and right pixels, which has been subsequently read out (2).

Conversely, during the first single readout time, the third pixel pair PX13 arranged in the first row ROW1 may generate pixel signals according to a second order. For example, the third pixel pair PX13 may read out (1) the third pixel signal VPX3 corresponding to a right pixel, and then read out (2) a summed pixel signal corresponding to a left pixel and the right pixel as the third pixel signal VPX3. In this case, the first power noise (a) may be reflected in the third pixel signal VPX3 corresponding to the right pixel, which has been first read out (1), and the second power noise (b) may be reflected in the third pixel signal VPX3 corresponding to the left and right pixels, which has been subsequently read out (2).

During the third single readout time allocated to the third row ROW3, the ninth pixel pair PX31 arranged in the third row ROW3 may generate pixel signals according to the second order. For example, the ninth pixel pair PX31 may read out (5) the first pixel signal VPX1 corresponding to a right pixel, and then read out (6) a summed pixel signal corresponding to a left pixel and the right pixel as the first pixel signal VPX1. In this case, the first power noise (a) may be reflected in the first pixel signal VPX1 corresponding to the right pixel, which has been first read out (5), and the second power noise (b) may be reflected in the first pixel signal VPX1 corresponding to the left and right pixels, which has been subsequently read out (6).

Conversely, during the third single readout time, the $11^{th}$ pixel pair PX33 arranged in the third row ROW3 may generate pixel signals according to the first order. For example, the $11^{th}$ pixel pair PX33 may read out (5) the third pixel signal VPX3 corresponding to a left pixel, and then read out (6) a summed pixel signal corresponding to a right pixel and the left pixel as the third pixel signal VPX3. In this case, the first power noise (a) may be reflected in the third pixel signal VPX3 corresponding to the left pixel, which has been first read out (5), and the second power noise (b) may be reflected in the third pixel signal VPX3 corresponding to the left and right pixels, which has been subsequently read out (6).

The image processor 200 may calculate a third average value AVR3 on the basis of the first pixel signal VPX1 corresponding to the left pixel of the first pixel pair PX11, the third pixel signal VPX3 corresponding to the left and right pixels of the third pixel pair PX13, the first pixel signal VPX1 corresponding to the left and right pixels of the ninth pixel pair PX31, and the third pixel signal VPX3 corresponding to the left pixel of the $11^{th}$ pixel pair PX33. For example, the third average value AVR3 may be calculated as shown in Equation 4 below.

[Equation 4]

$AVR3 =$ $(L1 + L3 + L9 + L11)/4 + \{2a + 2(b - a)\}/4 = (L1 + L3 + L9 + L11)/4 + 2b/4$

Herein, "L1" may refer to a pixel value of the first pixel signal VPX1 corresponding to the left pixel of the first pixel pair PX11. "L3" may refer to a pixel value of the third pixel signal VPX3 corresponding to the left pixel of the third pixel pair PX13. "L3" may be obtained by subtracting the pixel value R3 of the pixel signal corresponding to the right pixel of the third pixel pair PX13 from the pixel value S3 of the summed pixel signal corresponding to the third pixel pair PX13 (L3=S3–R3). "L9" may refer to a pixel value of the first pixel signal VPX1 corresponding to the left pixel of the ninth pixel pair PX31. "L9" may be obtained by subtracting the pixel value R9 of the pixel signal corresponding to the right pixel of the ninth pixel pair PX31 from the pixel value S9 of the summed pixel signal corresponding to the ninth pixel pair PX31 (L9=S9–R9). "L11" may refer to a pixel value of the third pixel signal VPX3 corresponding to the left pixel of the $11^{th}$ pixel pair PX33. "2a" may be a value obtained by adding up the first power noise (a), which is reflected in the first pixel signal VPX1 corresponding to the left pixel of the first pixel pair PX11, and the first power noise (a), which is reflected in the third pixel signal VPX3 corresponding to the left pixel of the $11^{th}$ pixel pair PX33. "2(b–a)" may be a value obtained by adding up third power noise (b–a), which is reflected in the third pixel signal VPX3 corresponding to the left pixel of the third pixel pair PX13, and fourth power noise (b–a), which is reflected in the first pixel signal VPX1 corresponding to the left pixel of the ninth pixel pair PX31. The third power noise (b–a) may be obtained by subtracting the first power noise (a), which is reflected in the third pixel signal VPX3 corresponding to the right pixel of the third pixel pair PX13, from the second power noise (b), which is reflected in the third pixel signal VPX3 corresponding to the third pixel pair PX13. The fourth power noise (b–a) may be obtained by subtracting the first power noise (a), which is reflected in the first pixel signal VPX1 corresponding to the right pixel of the ninth pixel pair PX31, from the second power noise (b), which is reflected in the first pixel signal VPX1 corresponding to the ninth pixel pair PX31.

The image processor 200 may calculate a fourth average value AVR4 on the basis of the first pixel signal VPX1 corresponding to the first pixel pair PX11, the third pixel signal VPX3 corresponding to the right pixel of the third pixel pair PX13, the first pixel signal VPX1 corresponding to the right pixel of the ninth pixel pair PX31, and the third pixel signal VPX3 corresponding to the $11^{th}$ pixel pair PX33. For example, the fourth average value AVR4 may be calculated as shown in Equation 5 below.

[Equation 5]

$AVR4 = (R1 + R3 + R9 + R11)/4 + \{2a + 2(b - a)\}/4 =$ $(R1 + R3 + R9 + R11)/4 + 2b/4$

Herein, "R1" may refer to a pixel value of the first pixel signal VPX1 corresponding to the right pixel of the first pixel pair PX11. "R1" may be obtained by subtracting the pixel value L1 of the pixel signal corresponding to the left pixel of the first pixel pair PX11 from the pixel value S1 of the summed pixel signal corresponding to the first pixel pair PX11 (R1=S1–L1). "R3" may refer to a pixel value of the third pixel signal VPX3 corresponding to the right pixel of the third pixel pair PX13. "R9" may refer to a pixel value of the first pixel signal VPX1 corresponding to the right pixel of the ninth pixel pair PX31. "R11" may refer to a pixel value of the third pixel signal VPX3 corresponding to the right pixel of the $11^{th}$ pixel pair PX33. "R11" may be obtained by subtracting the pixel value L11 of the pixel signal corresponding to the left pixel of the $11^{th}$ pixel pair PX33 from the pixel value S11 of the summed pixel signal corresponding to the $11^{th}$ pixel pair PX33 (R11=S11–L11). "2a" may be a value obtained by adding up the first power noise (a), which is reflected in the third pixel signal VPX3 corresponding to the right pixel of the third pixel pair PX13, and the first power noise (a), which is reflected in the first pixel signal VPX1 corresponding to the right pixel of the ninth pixel pair PX31. "2(b−a)" may be a value obtained by adding up fifth power noise (b−a), which is reflected in the first pixel signal VPX1 corresponding to the right pixel of the first pixel pair PX11, and sixth power noise (b−a), which is reflected in the third pixel signal VPX3 corresponding to the $11^{th}$ pixel pair PX33. The fifth power noise (b−a) may be obtained by subtracting the first power noise (a), which is reflected in the first pixel signal VPX1 corresponding to the left pixel of the first pixel pair PX11, from the second power noise (b), which is reflected in the first pixel signal VPX1 corresponding to the first pixel pair PX11. The sixth power noise (b−a) may be obtained by subtracting the first power noise (a), which is reflected in the third pixel signal VPX3 corresponding to the left pixel of the $11^{th}$ pixel pair PX33, from the second power noise (b), which is reflected in the third pixel signal VPX3 corresponding to the $11^{th}$ pixel pair PX33.

The image processor 200 may generate the image data PDAFs by performing an average calculating operation and a subtraction operation on the pixel signals DPXs for each region. For example, the image processor 200 may generate first image data PDAF1 corresponding to a difference between the third and fourth average values AVR3 and AVR4 in a 4×4 region including the first to $16^{th}$ pixel pairs PX11 to PX44. The first image data PDAF1 may be calculated as shown in Equation 6 below.

[Equation 6]

$$PDAF1 = \{(L1 + L3 + L9 + L11)/4 + 2b/4\} - \{(R1 + R3 + R9 + R11)/4 + 2b/4\} = (L1 + L3 + L9 + L11)/4 - (R1 + R3 + R9 + R11)/4$$

In the same manner as the first readout method, the first image data PDAF1 generated through the second readout method may be the image data for PDAF having excellent quality as the first and second power noise (a) and (b) reflected in the pixel signals of the first pixel pair PX11, the third pixel pair PX13, the ninth pixel pair PX31, and the $11^{th}$ pixel pair PX33 are removed or offset.

According to embodiments of the present disclosure, a readout order of neighboring pixel pairs may be controlled differently, which makes it possible to remove or offset noise reflected differently depending on readout points in time.

According to embodiments of the present disclosure, noise reflected in pixel signals may be suppressed, which makes it possible to improve the quality of an image, for example, image data for PDAF.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensor comprising:
   a first pixel pair arranged in a first row, and configured to generate, during a first single readout time, first and second pixel signals according to a first order;
   a second pixel pair arranged in the first row, and configured to generate, during the first single readout time, third and fourth pixel signals according to a second order which is different from the first order; and
   a row controller configured to control, during the first single readout time, the first pixel pair according to the first order and the second pixel pair according to the second order.

2. The image sensor of claim 1, wherein pixels included in the first pixel pair and pixels included in the second pixel pair have a same color filter.

3. The image sensor of claim 1,
   wherein the first pixel pair includes:
      a first floating diffusion node;
      a first transmission transistor connected to the first floating diffusion node;
      a first light receiving element connected between the first transmission transistor and a first voltage terminal, and disposed on a left side of the first pixel pair;
      a second transmission transistor connected to the first floating diffusion node; and
      a second light receiving element connected between the second transmission transistor and the first voltage terminal, and disposed on a right side of the first pixel pair, and
   wherein the second pixel pair includes:
      a second floating diffusion node;
      a third transmission transistor connected to the second floating diffusion node;
      a third light receiving element connected between the third transmission transistor and the first voltage terminal, and disposed on a left side of the second pixel pair;
      a fourth transmission transistor connected to the second floating diffusion node; and
      a fourth light receiving element connected between the fourth transmission transistor and the first voltage terminal, and disposed on a right side of the second pixel pair.

4. The image sensor of claim 3, further comprising first and second signal lines connected to the row controller,
   wherein:
   the first signal line is connected to a gate terminal of the first transmission transistor and a gate terminal of the fourth transmission transistor; and
   the second signal line is connected to a gate terminal of the second transmission transistor and a gate terminal of the third transmission transistor.

5. The image sensor of claim 3, further comprising first to fourth signal lines connected to the row controller,
   wherein:
   the first signal line is connected to a gate terminal of the first transmission transistor;
   the second signal line is connected to a gate terminal of the second transmission transistor;
   the third signal line is connected to a gate terminal of the third transmission transistor; and
   the fourth signal line is connected to a gate terminal of the fourth transmission transistor.

6. The image sensor of claim 1, further comprising:
   a third pixel pair arranged in a second row, and configured to generate, during a second single readout time, fifth and sixth pixel signals according to the second order; and a fourth pixel pair arranged in the second row, and configured to generate, during the second single readout time, seventh and eighth pixel signals according to the first order, wherein the row controller is configured to control, during the second single readout time, the third pixel pair according to the second order and the fourth pixel pair according to the first order.

7. The image sensor of claim 6, wherein the first pixel pair and the third pixel pair are connected to a first column line, and configured to output, through the first column line, the first and second pixel signals and the fifth and sixth pixel signals, and wherein the second pixel pair and the fourth pixel pair are connected to a second column line, and configured to output, through the second column line, the third and fourth pixel signals and the seventh and eighth pixel signals.

8. The image sensor of claim 6, wherein pixels included in the first pixel pair, pixels included in the second pixel pair, pixels included in the third pixel pair, and pixels included in the fourth pixel pair have a same color filter.

9. An image processing system comprising:

an image sensor including pixel pairs arranged at intersections of a plurality of rows and a plurality of columns, and configured to differently control a readout order of pixel pairs arranged in a same row among the plurality of pixel pairs and differently control a readout order of pixel pairs arranged in a same column among the plurality of pixel pairs; and an image processor configured to generate image data related to phase detection auto focus (PDAF) based on pixel signals generated by the image sensor.

10. The image processing system of claim 9, wherein the image sensor includes:

a first pixel pair arranged in a first row, and configured to generate, during a first single readout time, first and second pixel signals according to a first order;

a second pixel pair arranged in the first row, and configured to generate, during the first single readout time, third and fourth pixel signals according to a second order which is different from the first order; and a row controller configured to control, during the first single readout time, the first pixel pair according to the first order and the second pixel pair according to the second order.

11. The image processing system of claim 10, wherein pixels included in the first pixel pair and pixels included in the second pixel pair have a same color filter.

12. The image processing system of claim 10, wherein the first pixel pair includes:
a first floating diffusion node;
a first transmission transistor connected to the first floating diffusion node;
a first light receiving element connected between the first transmission transistor and a first voltage terminal, and disposed on a left side of the first pixel pair;
a second transmission transistor connected to the first floating diffusion node; and
a second light receiving element connected between the second transmission transistor and the first voltage terminal, and disposed on a right side of the first pixel pair, and wherein the second pixel pair includes:
a second floating diffusion node;
a third transmission transistor connected to the second floating diffusion node;
a third light receiving element connected between the third transmission transistor and the first voltage terminal, and disposed on a left side of the second pixel pair;
a fourth transmission transistor connected to the second floating diffusion node; and
a fourth light receiving element connected between the fourth transmission transistor and the first voltage terminal and disposed on a right side of the second pixel pair.

13. The image processing system of claim 12, wherein the image sensor further includes first and second signal lines connected to the row controller, wherein the first signal line is connected to a gate terminal of the first transmission transistor and a gate terminal of the fourth transmission transistor, and wherein the second signal line is connected to a gate terminal of the second transmission transistor and a gate terminal of the third transmission transistor.

14. The image processing system of claim 12, wherein the image sensor further includes first to fourth signal lines connected to the row controller, wherein the first signal line is connected to a gate terminal of the first transmission transistor, wherein the second signal line is connected to a gate terminal of the second transmission transistor, wherein the third signal line is connected to a gate terminal of the third transmission transistor, and wherein the fourth signal line is connected to a gate terminal of the fourth transmission transistor.

15. The image processing system of claim 10, wherein the image sensor further includes:
a third pixel pair arranged in a second row, and configured to generate, during a second single readout time, fifth and sixth pixel signals according to the second order; and
a fourth pixel pair arranged in the second row, and configured to generate, during the second single readout time, seventh and eighth pixel signals according to the first order, and wherein the row controller is configured to control, during the second single readout time, the third pixel pair according to the second order and the fourth pixel pair according to the first order.

16. The image processing system of claim 15, wherein the first pixel pair and the third pixel pair are connected to a first column line, and configured to output, through the first column line, the first and second pixel signals and the fifth and sixth pixel signals, and wherein the second pixel pair and the fourth pixel pair are connected to a second column line, and configured to output, through the second column line, the third and fourth pixel signals and the seventh and eighth pixel signals.

17. The image processing system of claim 16, wherein pixels included in the first pixel pair, pixels included in the second pixel pair, pixels included in the third pixel pair, and pixels included in the fourth pixel pair have a same color filter.

18. The image processing system of claim 9, wherein the image processor is configured to perform an average calculating operation and a subtraction operation on the pixel signals for each region to generate the image data.

19. A method of operating an image sensor, the method comprising:
generating, during a first single readout time, first and second pixel signals through a first pixel pair arranged in a first row, according to a first order; and
generating, during the first single readout time, third and fourth pixel signals through a second pixel pair arranged in the first row according to a second order which is different from the first order,
wherein the first and second pixel pairs are connected to neighboring columns.

20. The method of claim 19, further comprising:
generating, during a second single readout time, fifth and sixth pixel signals through a third pixel pair arranged in a second row, according to the second order; and
generating, during the second single readout time, seventh and eighth pixel signals through a fourth pixel pair arranged in the second row, according to the first order,
wherein the third and fourth pixel pairs are connected to neighboring columns.

* * * * *